United States Patent
Moynihan et al.

(10) Patent No.: US 7,292,756 B2
(45) Date of Patent: Nov. 6, 2007

(54) OPTICAL INTERFACE ASSEMBLY AND METHOD OF FORMATION

(75) Inventors: Matthew L. Moynihan, Sterling, MA (US); Bruno M. Sicard, Attleboro, MA (US); Carl J. Colangelo, New Bedford, MA (US); John P. Cahalen, Somerville, MA (US); Brian D. Amos, Kowloon (HK); Kevin S. Horgan, Uxbridge, MA (US); John J. Fisher, Blacksburg, VA (US); David W. Sherrer, Radford, VA (US)

(73) Assignee: Rohm and Haas Electronics Materials LLC, Marlborough, MA (US)

( * ) Notice: Subject to any disclaimer, the term of this patent is extended or adjusted under 35 U.S.C. 154(b) by 377 days.

(21) Appl. No.: 11/020,520

(22) Filed: Dec. 22, 2004

(65) Prior Publication Data

US 2005/0163431 A1 Jul. 28, 2005

Related U.S. Application Data

(60) Provisional application No. 60/532,020, filed on Dec. 22, 2003.

(51) Int. Cl.
*G02B 6/30* (2006.01)
*G02B 6/36* (2006.01)

(52) U.S. Cl. .............. 385/49; 385/53; 385/52; 385/65; 385/89; 385/90; 385/139; 385/14

(58) Field of Classification Search ............ 385/49, 385/52, 53, 65, 83, 76, 77, 88, 89, 90, 92, 385/93, 94, 139, 14, 56, 59
See application file for complete search history.

(56) References Cited

U.S. PATENT DOCUMENTS

| 5,134,679 A | 7/1992 | Robin et al. ............ 385/90 |
| 5,155,784 A | 10/1992 | Knott .................... 385/88 |

(Continued)

FOREIGN PATENT DOCUMENTS

EP 1 229 365 8/2002 ........ 385/49 X

OTHER PUBLICATIONS

European Search Report of corresponding European Application No. EP 04 25 7950, filed Dec. 18, 2004.

(Continued)

*Primary Examiner*—Brian M. Healy
(74) *Attorney, Agent, or Firm*—Jonathan D. Baskin

(57) ABSTRACT

Optical interface assemblies are provided. The optical interface assemblies include a first portion having a plurality of optical waveguides. The first portion is configured for mating engagement with an optical fiber connector. A second portion is mated to the first portion. The second portion is configured for mating engagement with an electronic substrate that includes an embedded waveguide assembly. The first and second portions are further configured so as to align the plurality of optical waveguides, at a first end of the first portion, with a plurality of corresponding waveguide cores of the embedded waveguide assembly. The first and second portions are further configured so as to align the plurality of optical waveguides, at a second end of the first portion, with a plurality of corresponding optical fibers in the optical fiber connector. Also provided are electronic assemblies and methods for coupling optical fibers with electronic substrate embedded waveguides.

20 Claims, 15 Drawing Sheets

U.S. PATENT DOCUMENTS

| | | | |
|---|---|---|---|
| 5,596,662 A | 1/1997 | Boscher | 385/55 |
| 5,613,024 A * | 3/1997 | Shahid | 385/52 |
| 5,721,798 A | 2/1998 | Kanda et al. | 385/58 |
| 5,960,141 A | 9/1999 | Sasaki et al. | 385/49 |
| 6,238,100 B1 | 5/2001 | Sasaki et al. | 385/59 |
| 6,302,590 B1 | 10/2001 | Moore | 385/53 |
| 6,386,767 B1 * | 5/2002 | Naghski | 385/59 |
| 6,402,393 B1 | 6/2002 | Grimes et al. | 385/89 |
| 6,412,986 B1 | 7/2002 | Ngo et al. | 385/53 |
| 6,464,403 B1 | 10/2002 | Koch et al. | 385/53 |
| 6,741,776 B2 * | 5/2004 | Iwashita et al. | 385/49 |
| 2002/0114589 A1 * | 8/2002 | Igl et al. | 385/88 |
| 2002/0196998 A1 | 12/2002 | Steinberg et al. | 385/14 |
| 2003/0048997 A1 | 3/2003 | Nobuhara et al. | 385/84 |
| 2003/0068137 A1 | 4/2003 | Rolston et al. | 385/78 |
| 2003/0095758 A1 | 5/2003 | Morse et al. | 385/89 |
| 2004/0105628 A1 | 6/2004 | Morse et al. | 385/89 |

OTHER PUBLICATIONS

Ando et al., "Multiport Optical Bare-Fiber Connector for Parallel Optical Interconnect Module", IEICE Transactions on Electronics, Institute of Electronics Information and Comm. Eng. Tokyo, JP, vol. E82-C, No. 1, Jan. 1999, pp. 72-80.

Katsura et al., "Packaging for a 40-channel Parallel Optical Interconnection Module with an over 25-Gb/s throughput", Electronic Components & Technology Conference, 1998. 48th IEEE Seattle, Washington, pp. 755-761.

Booth et al., "Polyguide™ Polymeric Technology for Optical Interconnect Circuits and Components", www.opticalcrosslinks.com/pdf/photonics97.pdf, Photonics West, Conference Proceedings, San Jose, California, Feb. 12-14, 1997, vol. 3005, pp. 238-251.

Y.S. Liu, "Progress in Optical Interconnects for Data Communication-Bringing Light to the Board, Backplane, and Intra Boxes", http://www.crd.ge.com/cooltechnologies/pdf/1997crd134.pdf, Manuscript prepared for IEEE Circuits and Devices Magazine, Jan. 1998, pp. 1-16.

* cited by examiner

OPTICAL INTERFACE ASSEMBLY AND METHOD OF FORMATION

CROSS-REFERENCE TO RELATED APPLICATIONS

This application claims the benefit under 35 U.S.C. §119 (e) of U.S. Provisional Application No. 60/532,020, filed Dec. 22, 2003, the entire contents of which are incorporated herein by reference.

BACKGROUND

The present invention relates generally to optical communication systems, and, more particularly to a method and structure for coupling optical fibers with printed wiring board embedded waveguides.

There are many well-recognized benefits of using optical fiber to replace copper wiring for printed circuit boards (PCBs) in computer and networking equipment. Such potential benefits include increased bandwidth and data rate, overcoming bottlenecks in the processing architecture, immunity to electromagnetic interference and reductions in radiated noise from the system, reduced latency by elimination of optical/electrical (O/E) conversions, more dense packaging at lower cost per pin, and enablement of new processor interconnect technologies such as meshed rings. These and other factors directly contribute to the performance of the computer system (e.g., increased processing power in MIPS (million instructions per second) or FLOPS (floating-point operations per second), increased node count in parallel architectures, etc.).

With the dramatic increase in processor speed over the last several years and the anticipation that this trend will continue, the copper interconnect technology will be unable to scale to the bandwidth requirements of the processing units. Fiber optic components, on the other hand, do not suffer from the bandwidth/distance constraints of copper and are thus becoming a preferred medium for very high bandwidth transmission between processing units. But, in order to fully realize these benefits, the optical fiber interconnect components should also continue to provide benefits of the existing electrical connection technologies.

Currently, there are no known available methods for directly coupling light from an incoming fiber to embedded waveguides formed within a printed wiring board (PWB) substrate. Instead, conventional connector assemblies focus on fiber-to-fiber coupling.

For example, U.S. Pat. No. 6,402,393 to Grimes, et al. discloses an interconnection system for optical circuit boards having a number of optical devices that are connected to and disconnected from a backplane. The optical circuit boards use jack receptacles affixed to the edge of the circuit board for making connection to the backplane, which contains an array of optical plugs. The corresponding optical plugs and jacks are not individually interlocked when coupled, thus facilitating removal of the optical circuit board from the backplane.

U.S. Pat. No. 6,412,986 to Ngo, et al. discloses an adapter for ganging multiple optical connectors together. The adapter includes a frame for mounting to a printed circuit board and at least one adapter housing movably mounted in a receiving area of the frame. The adapter housing is sized and shaped to receive two or more optical connectors therein and individually connect the optical connectors to the adapter housing. The optical connectors are received in opposite directions into the adapter housing and connect to each other inside the adapter housing.

U.S. Patent Application Publication US 2003/0095758 by Morse, et al. is directed toward an optical connector adapter for interfacing single or multichannel devices to fiber. The adaptor is provided with a substrate for transporting optical signals, and having opposing ends, a top reference surface and a single side surface. A substrate carrier receives the substrate and a carrier bracket that is received over the top reference surface of the substrate using carrier alignment fiducials. However, the Morse disclosure still does not provide a direct interface between, for example, a fiber optic connector and optical waveguides formed within a printed wiring board.

U.S. Pat. No. 6,302,590 to Moore discloses an optical connector featuring a housing portion with a first bay for engaging a plug having a waveguide. The first bay is partially open at a proximal end and has a wall at a distal end thereof. A chamber adjoins the first bay at the wall, and has an optical pathway therein. In addition, at least two external passive alignment pins are integrally formed with the first bay for engaging recesses in a first plug. The external passive alignment pins passively align the waveguide to the optical pathway, and an opening in the wall allows for transmission of an optical signal along the optical pathway between the first plug and the chamber.

U.S. Pat. No. 5,155,784 to Knott is directed toward an optical connection means between an optical guide carried by a circuit board and an optical guide carried by or associated with a backplane. The connection means includes a two-part plug and socket mechanical connector in combination with a two-part plug and socket optical fiber connector. One part of the mechanical connector is moveable to a limited extent with respect to the carrying circuit board or backplane, while the other part is fixedly secured thereto. One part of the optical fiber connector is housed and fixedly secured to the fixed part of the mechanical connector, while the other part of the optical fiber connector is slidably mounted in the moveable part of the mechanical connector.

Accordingly, it would be desirable to be able to conveniently and reliably couple/decouple light from optical fiber connector to embedded PWB waveguides in a manner compatible with existing connector technology.

STATEMENT OF THE INVENTION

In a first aspect, there is provided an optical interface assembly. The optical interface assembly includes a first portion having a plurality of optical waveguides. The first portion is configured for mating engagement with an optical fiber connector. A second portion is mated to the first portion. The second portion is configured for mating engagement with an electronic substrate that includes an embedded waveguide assembly. The first and second portions are further configured so as to align the plurality of optical waveguides, at a first end of the first portion, with a plurality of corresponding waveguide cores of the embedded waveguide assembly. The first and second portions are further configured so as to align the plurality of optical waveguides, at a second end of the first portion, with a plurality of corresponding optical fibers in the optical fiber connector.

In another aspect, an electronic assembly is provided. The electronic assembly includes an optical interface assembly as described above, and an electronic substrate that includes an embedded waveguide assembly. The second portion of the optical interface assembly is mated with the electronic substrate such that the plurality of optical waveguides are aligned, at a first end of the first portion, with a plurality of corresponding waveguide cores of the embedded waveguide assembly.

In another aspect, a method for coupling optical fibers with an electronic substrate is provided. The method includes forming an optical interface assembly having a first portion and a second portion. The first portion has a plurality of optical waveguides. The first portion is further configured for mating engagement with an optical fiber connector. The second portion is mated to the first portion. The second portion is further configured for mating engagement with an electronic substrate having an embedded waveguide assembly. The first and second portions are further configured so as to align the plurality of optical fibers, at an end of the first portion, with a plurality of corresponding waveguide cores of the embedded waveguide assembly.

BRIEF DESCRIPTION OF THE DRAWINGS

Referring to the exemplary drawings wherein like elements are numbered alike in the several Figures.

DETAILED DESCRIPTION

Disclosed herein is a method and structure for coupling optical fibers with embedded waveguides formed within an electronic substrate. Briefly stated, an optical interface assembly includes a first portion and a second portion, wherein the first portion is configured to house a plurality of optical fibers therein and for mating engagement with an optical fiber connector at a first end thereof. The optical fiber connector can be, for example, an MT connector and the like. As used hereinafter, the term "electronic substrate" may describe structures such as, for example, printed wiring board substrates, semiconductor substrates, glass substrates, mylar substrates, and the like. For purposes of description, the term "printed wiring board" (PWB) or "PWB substrate" is also used interchangeably hereinafter with the term "electronic substrate."

As set forth in further detail later, a mating engagement between various constituent components is described in terms of one or more types of male/female mating arrangements. Thus, the term "male alignment feature" as used hereinafter can describe any male protrusion of any suitable shape, including, but not limited to, rails, pins, posts, studs, spheres, bumps and the like. Similarly, the term "female alignment feature" as used hereinafter can describe any female receiving feature of any suitable shape, including, but not limited to, slots, grooves, receptacles, holes, voids, and the like.

Accordingly, mating engagement between the first portion and the connector can be accomplished by various means, for example, one or more alignment pins, alignment spheres, and the like. The second portion of the optical interface assembly is configured to be joined with the first portion. Further, the second portion of the optical interface assembly includes, for example, one or more protrusions for mating engagement with corresponding slots formed within a printed wiring board substrate having embedded waveguides therein, or vice versa. That is, the components with male alignment features can be provided with female alignment features and vice versa.

Once the second and first portions are mated, the integrated optical interface assembly is affixed to the printing wiring board in a manner such that ends of the fibers housed in the first portion are aligned with corresponding embedded waveguides in the PWB. A connector may thereafter be plugged into the other end of the first portion, thereby completing an interface between the connector-terminated optical fibers and the embedded waveguides of the PWB.

Figure 1:
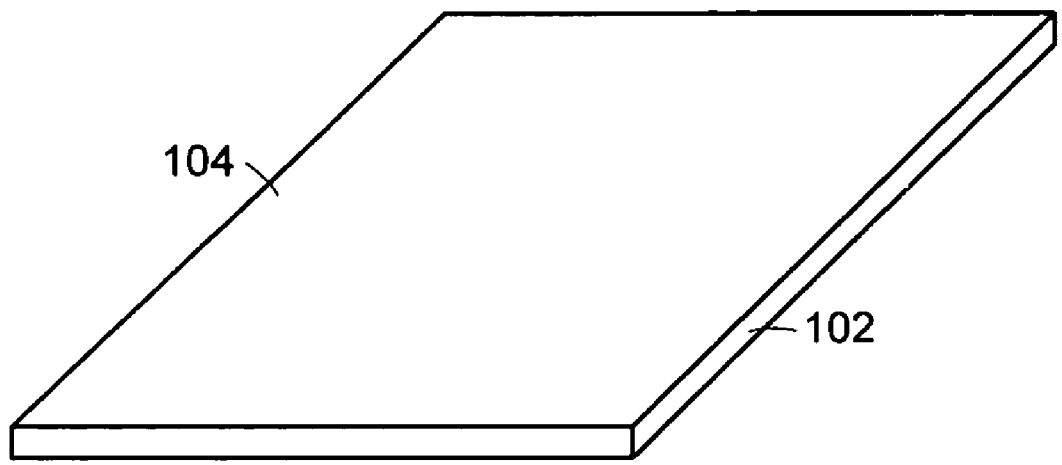
FIGS. 1 through 10 illustrate an exemplary processing sequence that may be implemented in the formation of a printed wiring board having embedded waveguides therein, suitable for use in accordance with an embodiment of the invention.
Figure 2:
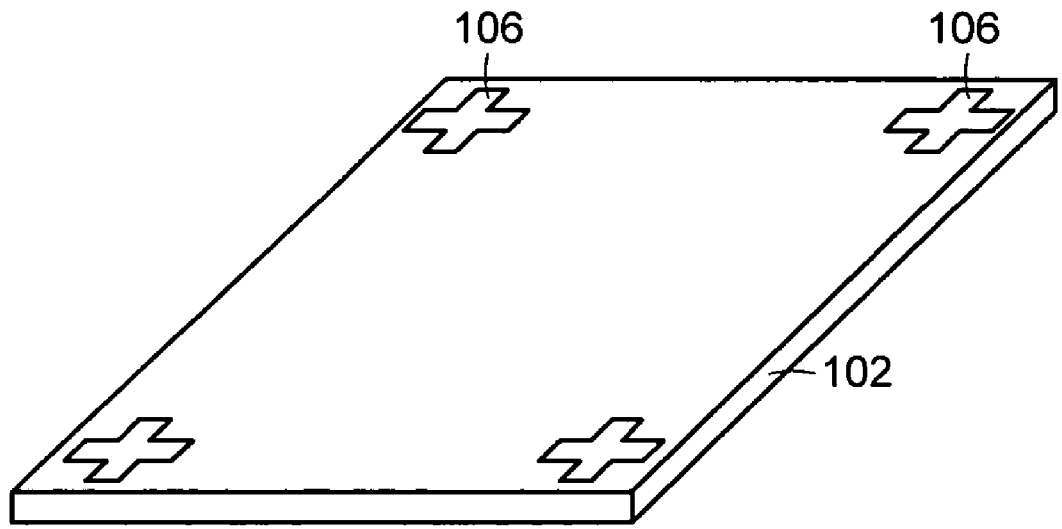

Referring initially to FIGS. 1 through 10, there is shown an exemplary processing sequence that may be implemented in the formation of a printed wiring board having embedded waveguides therein, suitable for use in accordance with an embodiment of the invention. In particular, FIG. 1 illustrates a PWB substrate 102 such as, for example, an FR4 board (or other type of substrate used in the electronics industry) that includes a metal layer 104 (e.g., copper, copper alloy, or other suitable conducting or insulating layer) formed thereupon. As is known in the art, FR4 is a general grade laminate made of woven fiberglass fabric saturated with an epoxy resin. This laminate is used in both double sided materials and multilayer base materials. FR4 is generally considered to have the best physical, thermal and electrical properties of all of the laminates for many circuit board applications. Again, however, other materials, such as polyamides, PTFE, etc., may also be used. As shown in FIG. 2, portions of the metal layer 104 are etched to create alignment fiducials 106 for subsequent passive alignment of the fibers of the interface assembly with the embedded waveguides of the wiring board 102. The etching may be accomplished by standard photolithographic and etching patterning techniques.

Figure 3:
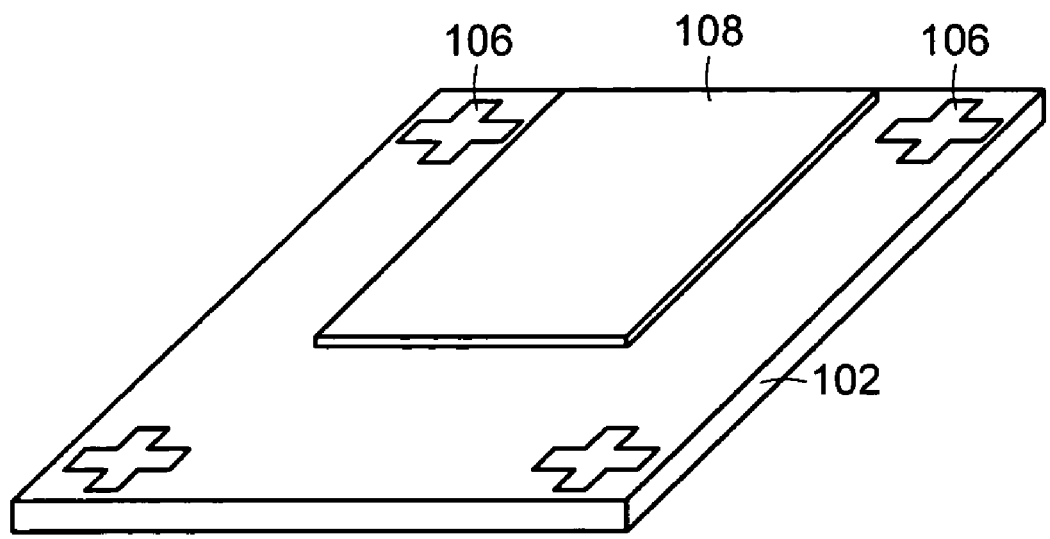
Figure 4:
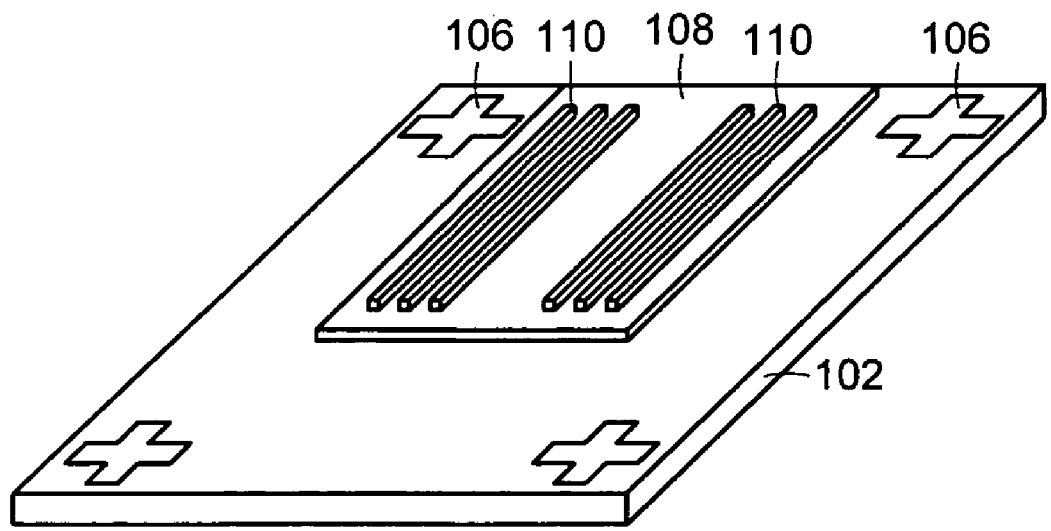
Figure 5:
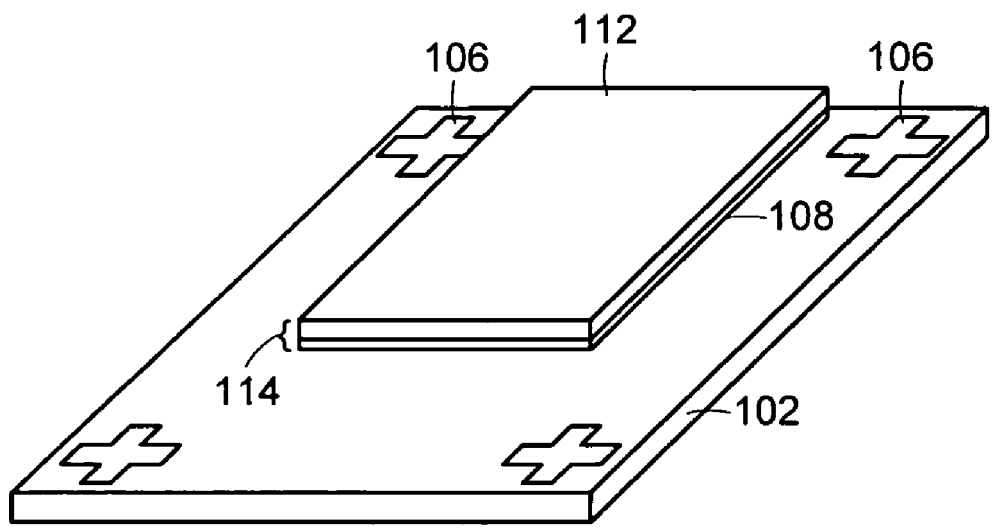

Referring now to FIG. 3, a bottom clad layer 108 is coated onto the metal layer 104 (or the underlying surface if the metal has been etched) of the PWB substrate 102. The bottom clad layer 108 forms part of the cladding material of the embedded waveguide and may be uniformly coated onto the PWB 102 (and thereafter optionally patterned to a desired size as shown in FIG. 3). In FIG. 4, a plurality of waveguide core segments 110 are formed over the bottom clad layer 108 by coating a layer of core material and subsequent imaging, developing and curing. In an exemplary embodiment, the core layer material (and thus the core segments 110) has a thickness of about 5 to about 500 microns ($\mu m$) and, more particularly, about 50±2 $\mu m$. The fiducial marks 106 may be used to align a photomask for defining the location of the core segments 110. After the formation of the core segments 110, a top clad layer 112 is formed over the core segments 110 and bottom clad layer 108, as shown in FIG. 5. Alignment of the top clad layer 112 and bottom clad layer 108 can be achieved through reference to the fiducial marks 106 or by aligning to the core segments 110. In an exemplary embodiment, the top clad layer 112 and bottom clad layer may each have a thickness of about 5 to about 500 $\mu m$ and, more particularly, about 50 $\mu m$.

Figure 6:
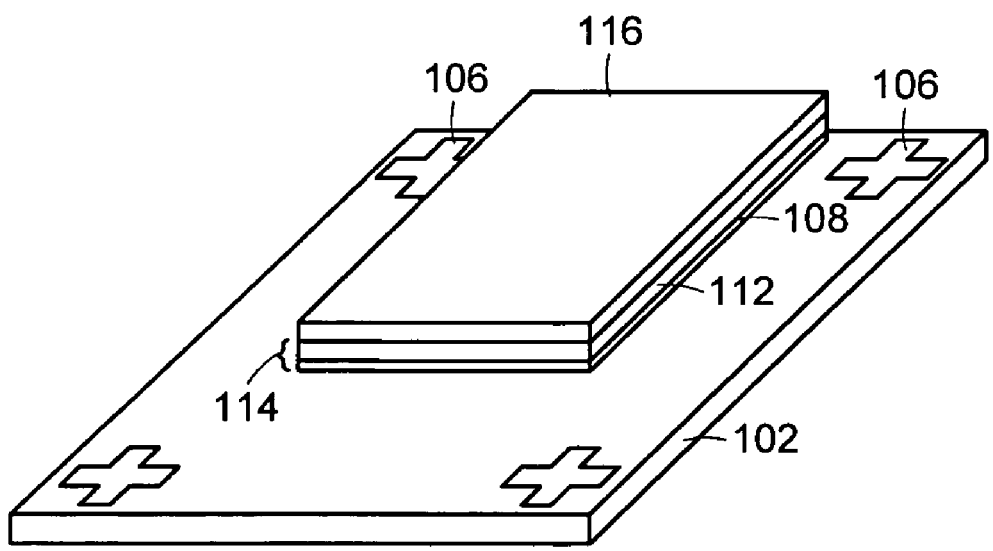

Thus formed, the bottom clad layer 108, core segments 110 and top clad layer 112 collectively form an optical layer 114 on the PWB 102. The clad/core/clad optical layer 114 may be made from any suitable optical materials known in the art including, but not limited to, epoxy, acrylate, siloxane, silsesquioxane, polyimide, or combinations thereof. One or more of the clad/core/clad layers making up the optical layer 114 may be photoimageable. In the case of a photoimageable top clad layer 108, alignment thereof can be made to corresponding alignment features formed simultaneously with the core segments 110, as discussed in further detail hereinafter. The materials can be independently selected, with the understanding that the refractive index of the final core structure should be greater than that of the cladding. In addition, FIG. 6 illustrates the formation of an optional top board dielectric layer 116 over the top clad layer 112 to serve as a solder mask.

Figure 7:
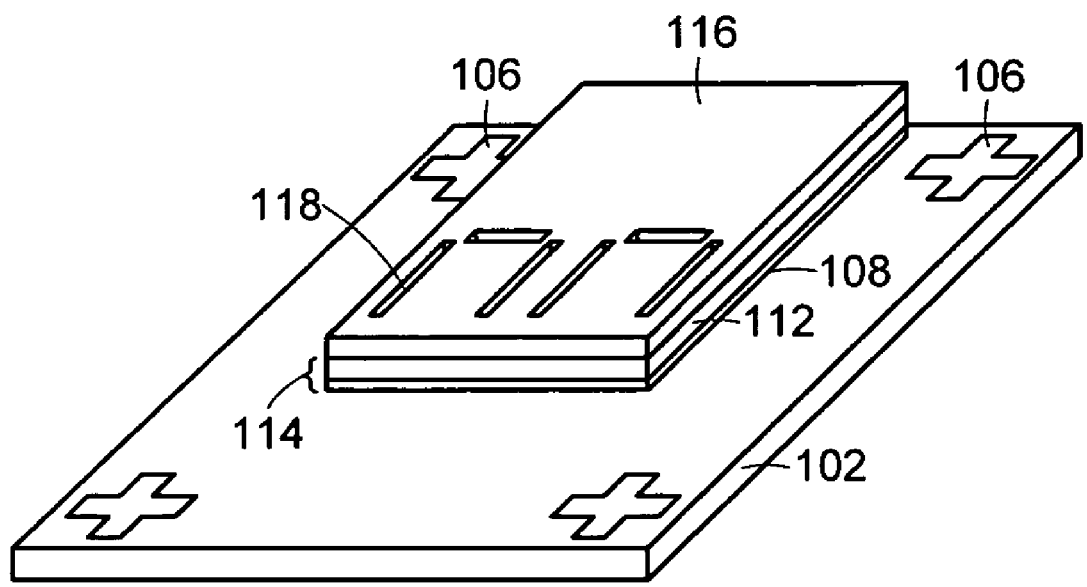

Then, as shown in FIG. 7, a series of alignment slots 118 are formed within the dielectric layer 116 (and, optionally, a portion or all of optical layer 114) for receiving the optical interface assembly that will eventually be affixed thereto.

In the embodiment illustrated, there are two sets of alignment slots shown, with three slots per interface assembly arranged in a U-shaped configuration. However, the PWB 102 may be sized to accommodate a different number of interface assemblies as desired. Moreover, there may be a different number of slots and arrangements used in receiving the interface assemblies. For example, instead of the three-slot U-shaped configuration, a pair of slots can be formed to accept the interface assembly (i.e., the horizontally disposed slot is not used). Regardless of the number and arrangement of the alignment slots 118 used, they may be formed through, for example, anisotropic dry etching or through laser ablation/drilling controlled by a microstage with the fiducial marks 106 being used to align the laser drill. Alternatively, a thicker top clad layer 112 that is photoimageable can be used in place of the top dielectric layer 116. Such a photoimageable clad could be aligned with the alignment marks on the core layer and exposed and developed to create trenches.

Figure 8:
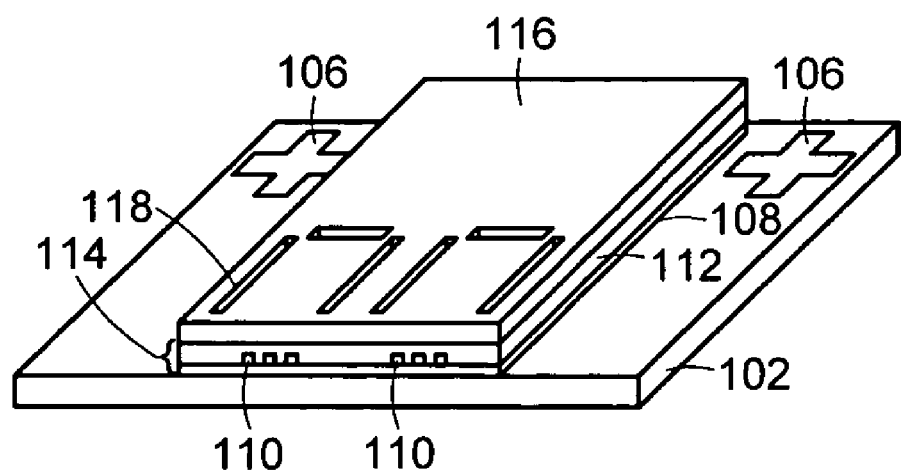
Figure 9:
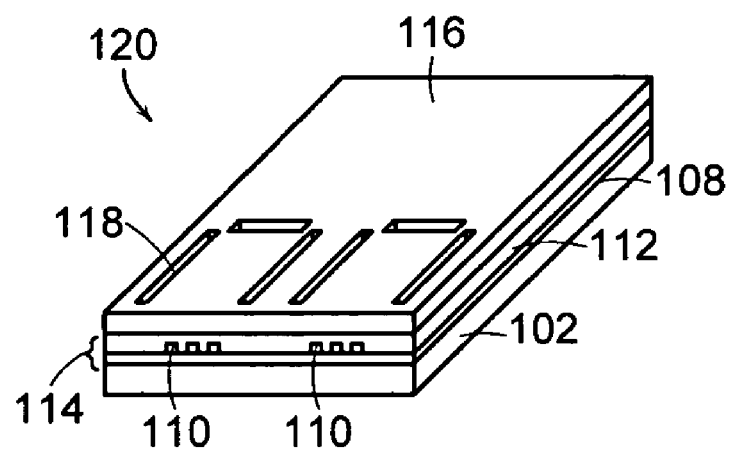
Figure 10:
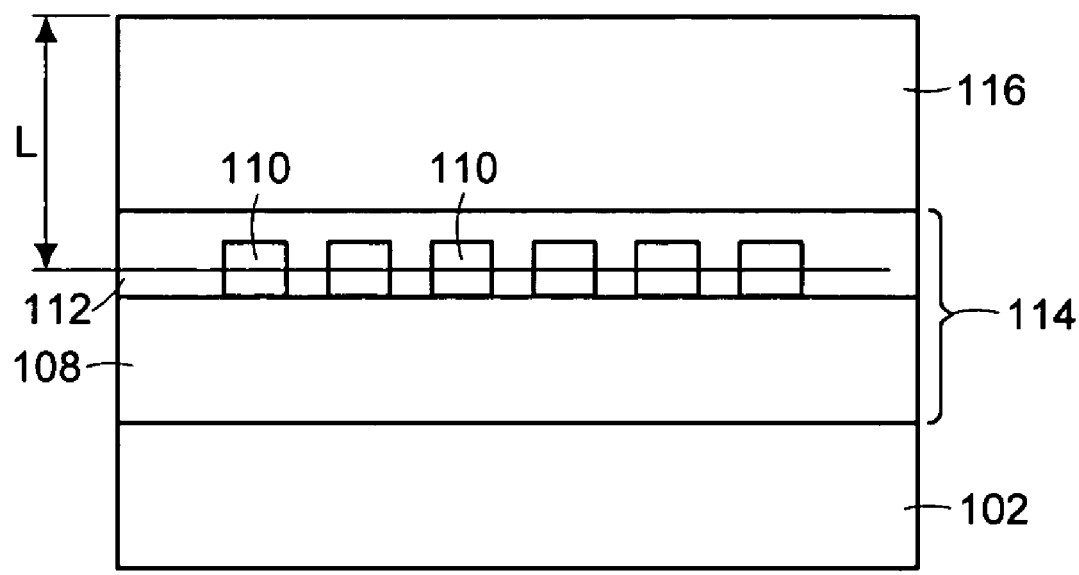
Figure 11:
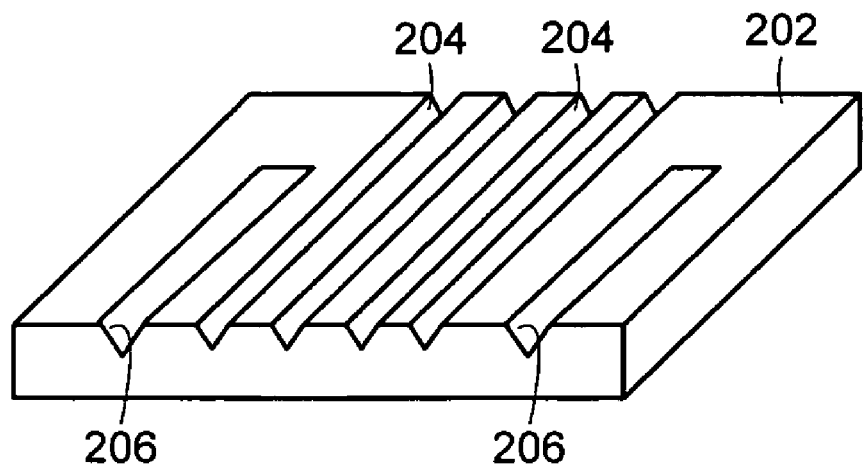
FIGS. 11 through 17 illustrate an exemplary processing sequence for forming an optical interface assembly for mating engagement with the embedded waveguide assembly of FIGS. 1-10.

As shown in FIG. 8, a portion of the PWB substrate 102, optical layer 114 and dielectric layer 116 is removed so as to expose an end face of each the embedded waveguide core segments 110. This may be accomplished through any appropriate technique, such as dicing, laser drilling or photolithographic etching, with the newly exposed end faces of the waveguide core segments 110 being polished thereafter if necessary. In FIG. 9, excess portions of the PWB 102 may be removed, thereby leaving a completed embedded waveguide assembly 120. As shown in FIG. 10, the manufacturing of the embedded waveguide assembly 120 is carried out with tight alignment tolerances so as to produce a desired distance, L, between the center of the core segments 110 and the top of the dielectric layer 116, wherein L is determined by the thickness of the top clad layer 112, plus the thickness of the dielectric layer, minus half the thickness of the waveguide core segments. By way of example, if the thickness of the top clad and dielectric layers is 50 µm and the thickness of the core segments is 25 µm, then L=50 µm+50 µm−½(25 µm)=87.5 µm.

Referring generally now to FIGS. 11-17, there is illustrated an exemplary processing sequence for forming an optical interface assembly for mating engagement with the embedded waveguide assembly 120. A first portion of the optical interface assembly includes a base member 202 having a plurality of fiber grooves 204 formed therein. In one embodiment, the base member 202 may be formed from a semiconductor substrate (for example, a single crystal silicon substrate such as a (100)-oriented singe crystal silicon substrate), and the fiber grooves 204 may be V-shaped grooves etched in the silicon. Other materials are also contemplated, such as molded plastic however. In any case, the fiber grooves 204 are configured to accommodate a plurality of optical fibers (not shown in FIG. 11) inserted therein. In addition, another set of larger grooves 206 are formed in the base member 202 in order to accommodate male alignment pins (not shown in FIG. 11) inserted therein. It will be noted that the alignment pin grooves 206 need not extend through the entire length of the base member 202.

Figure 12:
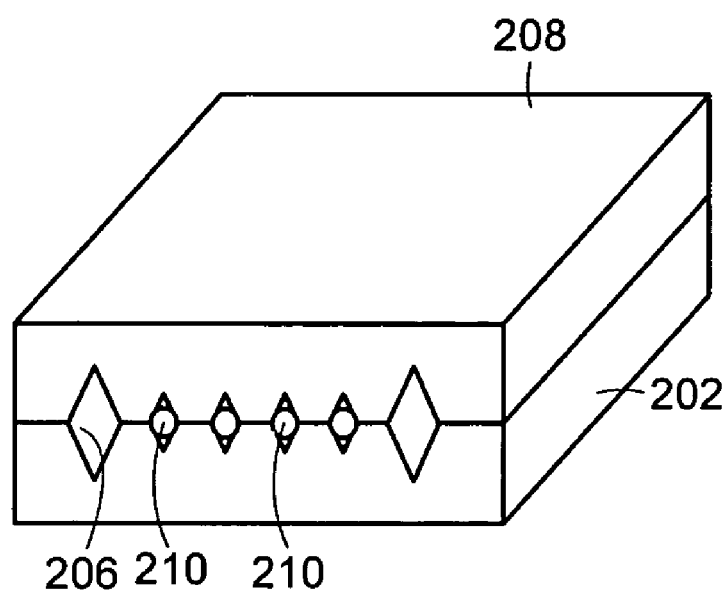
Figure 13:
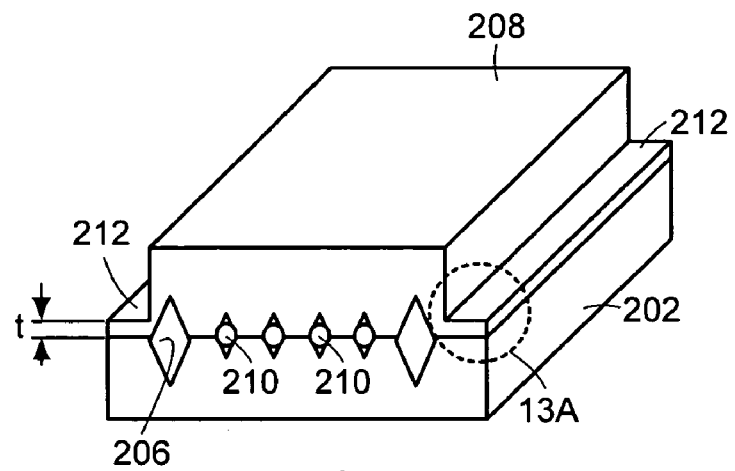
Figure 13A:
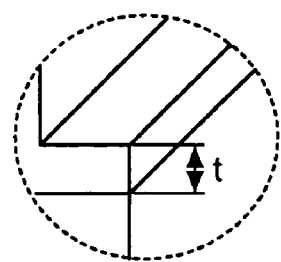

In FIG. 12, a top member 208 is shown covering the base member 202, along with a plurality of optical fibers 210 inserted therebetween. The top member can be formed from the same materials described above with reference to the base member 202, and is typically formed from the same material. The top member can optionally be of the same shape as the base member 202, as illustrated. One of the base member 202 and top member 208 may alternatively include a planar surface instead of the fiber grooves. The base and top members are sealed by epoxy or other adhesive materials, and the ends of the optical fibers 210 may be polished. As shown in FIG. 13, portions of the top member 208 may removed (e.g., by etching or machining) along the outer edges thereof so as to create flanges 212 which may subsequently be used to receive and facilitate the attachment of the second portion of the optical interface assembly thereto. Thereby, a first portion of the optical interface assembly is defined. As will be appreciated hereinafter, the thickness "t" of the flanges 212 coincides with the distance L from the manufacture of the embedded waveguide assembly 120. In an alternative embodiment, the flanges 212 could also be formed simply by forming the top member 208 at a smaller width than the base member 202, such that the top surface of the base member 202 serves as a reference datum for the fiber and pin grooves 204, 206, as well as for a receiving surface for attachment of the second portion thereto.

Figure 14:
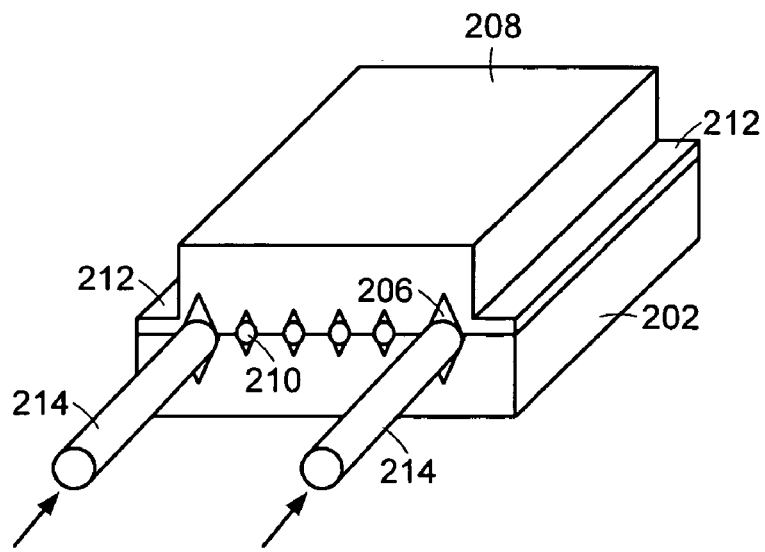

FIG. 14 illustrates the insertion of a pair of alignment pins 214 within the alignment pin grooves 206. The pins 214 may be secured by epoxy, for example. It will be appreciated, however, that the pins 214 may also be inserted during an earlier processing stage, such as after the formation of the base member 202 in FIG. 11.

Figure 15:
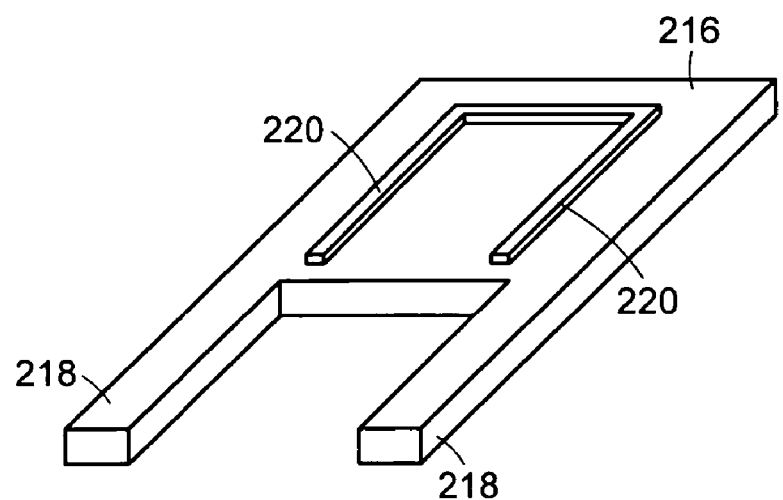

Referring to FIG. 15, a second portion of the optical interface assembly is illustrated. As is the case with the first portion, the second portion may be made from a substrate 216 of a material as described above with reference to the base and top members. A pair of prongs 218 included on the substrate is configured to engage the flanges 212 from the first portion. A plurality of rails 220 are also included on the bottom surface of the substrate 216 for mating engagement with the alignment slots 118 on the embedded waveguide assembly 120. It will be noted that the particular view illustrated in the Figure is "upside down" so that the rails are shown. Although FIG. 15 shows a U-shaped configuration for the rails 220, other configurations are also contemplated so long as the rail configuration matches the slot configuration.

Figure 16:
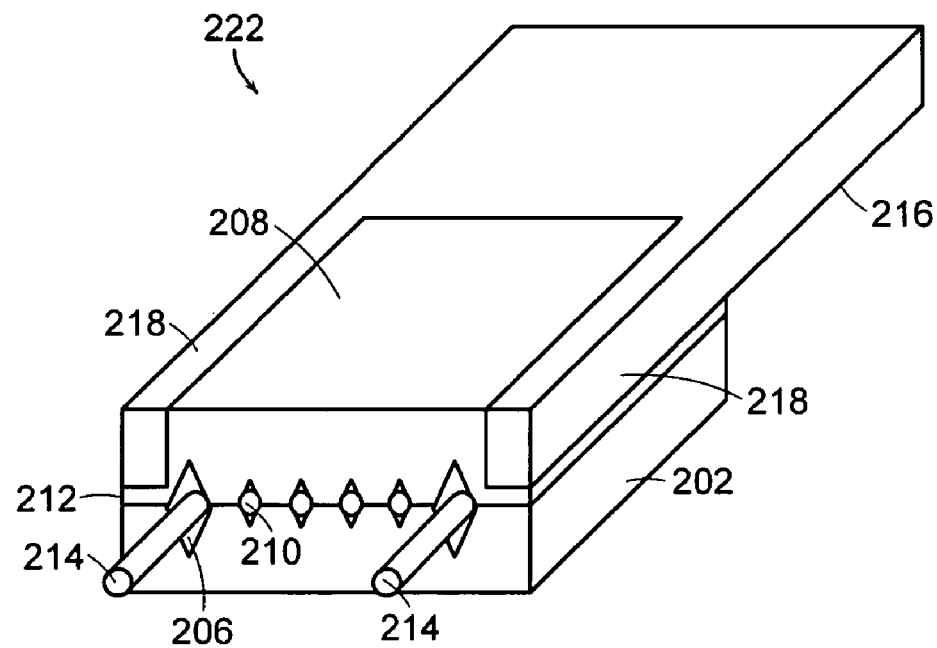
Figure 17:
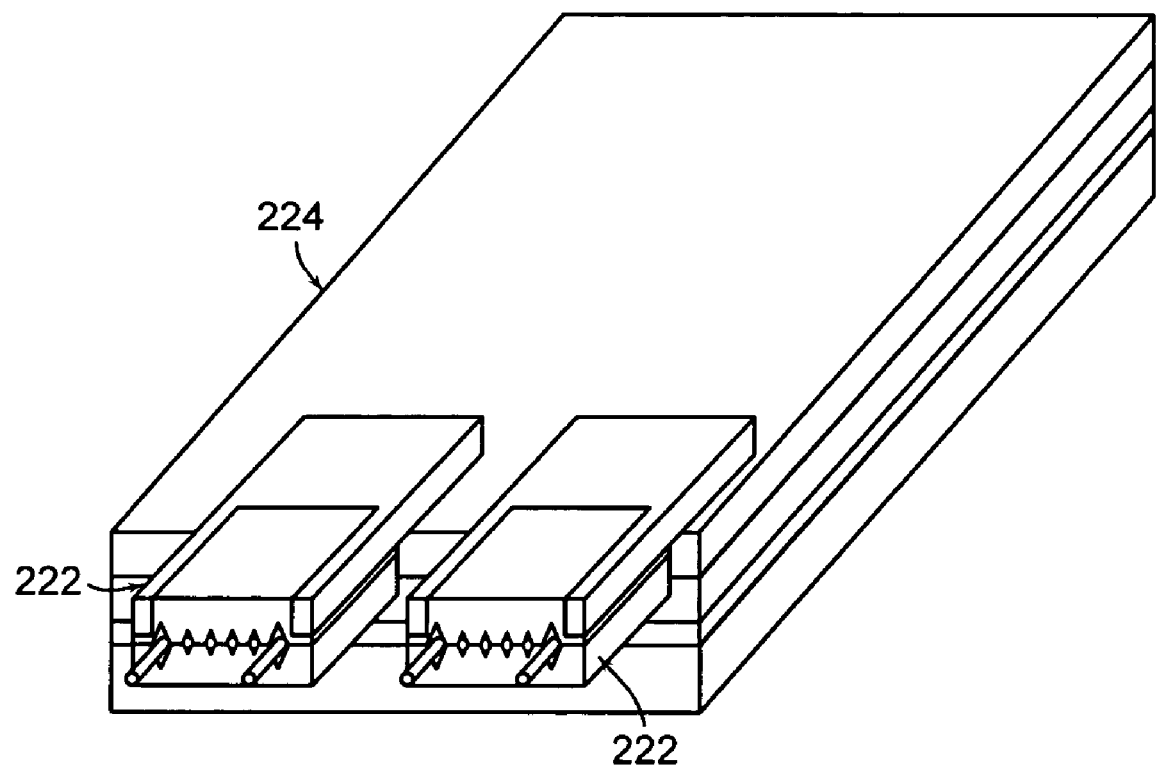

Once the first and second portions are completed, they are mated with one another as shown in FIG. 16. The portions may be bonded together, for example, by epoxy or other suitable bonding material. The resulting optical interface assembly 222 is then capable of providing an interface between an optical fiber connector and the embedded waveguide assembly 120. Finally, as shown in FIG. 17, a pair of optical interface assemblies 222 is shown mounted to a corresponding pair of completed embedded waveguide assemblies (not shown in FIG. 17) formed within a printed wiring board 224. Alignment of the fibers within the optical interface assemblies 222 with the waveguide cores may be implemented, for example, by a pre-aligning step using the rails/slots, and then by active alignment and bonding of the optical interface assemblies 222 to the board 224 using a bonding agent such as an epoxy.

Although the illustrative embodiment depicted implements the use of rails defined on the second portion of the optical interface assembly 222 and slots defined on the embedded waveguide assembly 120, it will be appreciated that the reverse may be applied as well. That is, the embedded waveguide assembly 120 could be imaged so as to have rails (i.e., male alignment features) defined thereon, while the second portion of the optical interface assembly could be machined, etched or otherwise formed so as to have slots defined therein (i.e., female alignment features).

Moreover, it will also be appreciated that alignment fiducials 106 need not be formed along the outer perimeter of the FR4 board, as is shown in FIG. 2. Instead, the fiducials may also be formed directly into the embedded waveguide assembly itself, as will be shown in a further embodiment hereinafter. For example, during patterning of the waveguide core segments, alignment fiducials could also be patterned from the core material. If the top clad layer is photoimageable, then the alignment fiducial could also serve as a male or female alignment feature for the optical interface assembly.

Referring now generally to FIGS. 18 through 21, there is shown an alternative embodiment of an optical interface assembly 300, wherein the assembly 300 is depicted as a translucent structure for illustrative purposes. In particular, it will be noted that a first portion 301 includes a base member 302 having a plurality of fiber grooves 304 formed therein, as well as a pair of alignment pin grooves 306 formed therein. As shown in the exploded perspective views of FIGS. 18 and 19, a plurality of optical fibers 308 and a pair of alignment pins 310 are configured to be disposed within the fiber grooves 304 and alignment pin grooves 306, respectively. In addition, a lid member 312 is provided for covering the plurality of optical fibers 308. As is the case with the earlier embodiment, the alignment pins 310 are configured to mate with an optical connector 314, such as an MT connector for example.

A second portion 315 of the optical interface assembly 300 includes a top member 316 that is configured to cover the lid member 312, as well as the alignment pins 310. Thus, at a first end 318 of the second portion 315, there is provided a recess portion 320 to accommodate the lid member 312 and a pair of alignment pin grooves 321 to accommodate the alignment pins 310. A second end 322 of second portion 315 is configured for mating engagement with the embedded waveguide assembly and printed wiring board, as discussed above.

Although the Figures show the optical interface assembly 300 having male pins 310 for connection to an MT or other connector with female receptacles, the opposite configuration could also be used. In other words, the assembly 300 is also compatible for use with a connector having male pins, wherein the assembly would include receptacles for the connector pins. This could be implemented, for example, by using shorter pins 310 for alignment between the base and top members 302, 316. In that manner, a portion of the alignment pin grooves 306 could also serve as a female connection receptacle for male connector pins.

The base member 302 may be made, for example, from silicon or plastic. In embodiments where the grooves 304, 306 are manufactured though anisotropic etching of silicon, the cores of the optical fibers may be registered to submicron tolerances with respect to a reference surface (i.e., the top of the base member 302 in the illustrated embodiment). Moreover, through suitable etching techniques, the alignment pins grooves 306 may be manufactured at the same time as the optical fiber grooves 304. Again, however, although silicon etching is a suitable option for manufacturing grooves with tight tolerances, plastic injection molding and other fabrication techniques may be implemented.

The lid member 312 may also be made of silicon or plastic, and configured to contain corresponding fiber grooves provided in the base member 302 in order to secure the fibers 308. In an exemplary embodiment, the optical fibers 308 may be placed in grooves 304 of the base member 302 and secured with lid member 312 with a suitable bonding material such as epoxy. Other means could also be used to secure the fibers 308 and, as such, the lid member 312 may optionally be omitted.

Once the base member 302 and fibers 308 are secured respect to one another, the optical interface assembly 300 may be ground and/or polished on both the front and back sides thereof. This provides an assembly wherein light can pass from one side to the other, with the fibers 308 serving as optical waveguides. Following an exemplary polishing process, alignment pins 310 may then be inserted into the grooves 306 of the base member 302. In the embodiment shown, the lid member 312 securing the fibers 308 does not interfere with the assembly of the pins 310, which also may be bonded in place with a suitable bonding material.

Next, the top member 316 is attached to the base member 302 and over lid member 312. Again, the top member 316 may be manufactured from silicon, plastic, or other suitable material and contains corresponding grooves 321 to accommodate the alignment pins 310. The grooves 321 also provide a means to accurately register the position of the top member 316 with respect to the base member 302. This registration allows for the holding of the bottom surface of the top member 316 at an accurate, predetermined spacing for mating with features on the printed wiring board substrate 102.

It should also be noted at this point that the formation of the embedded waveguide assembly 120 be implemented substantially as described earlier, depending on the location of choice for the alignment fiducials and the availability of a photoimageable top clad layer. Regardless of whether the male/female attachment mechanism is formed by laser drilling of a top clad layer or by photoimaging, the embedded waveguide assembly 120 formed on printed wiring board 102 features a bottom clad layer 108, waveguide core segments 110, top clad layer 112 and (optionally) dielectric layer/solder mask 116.

Figure 18:
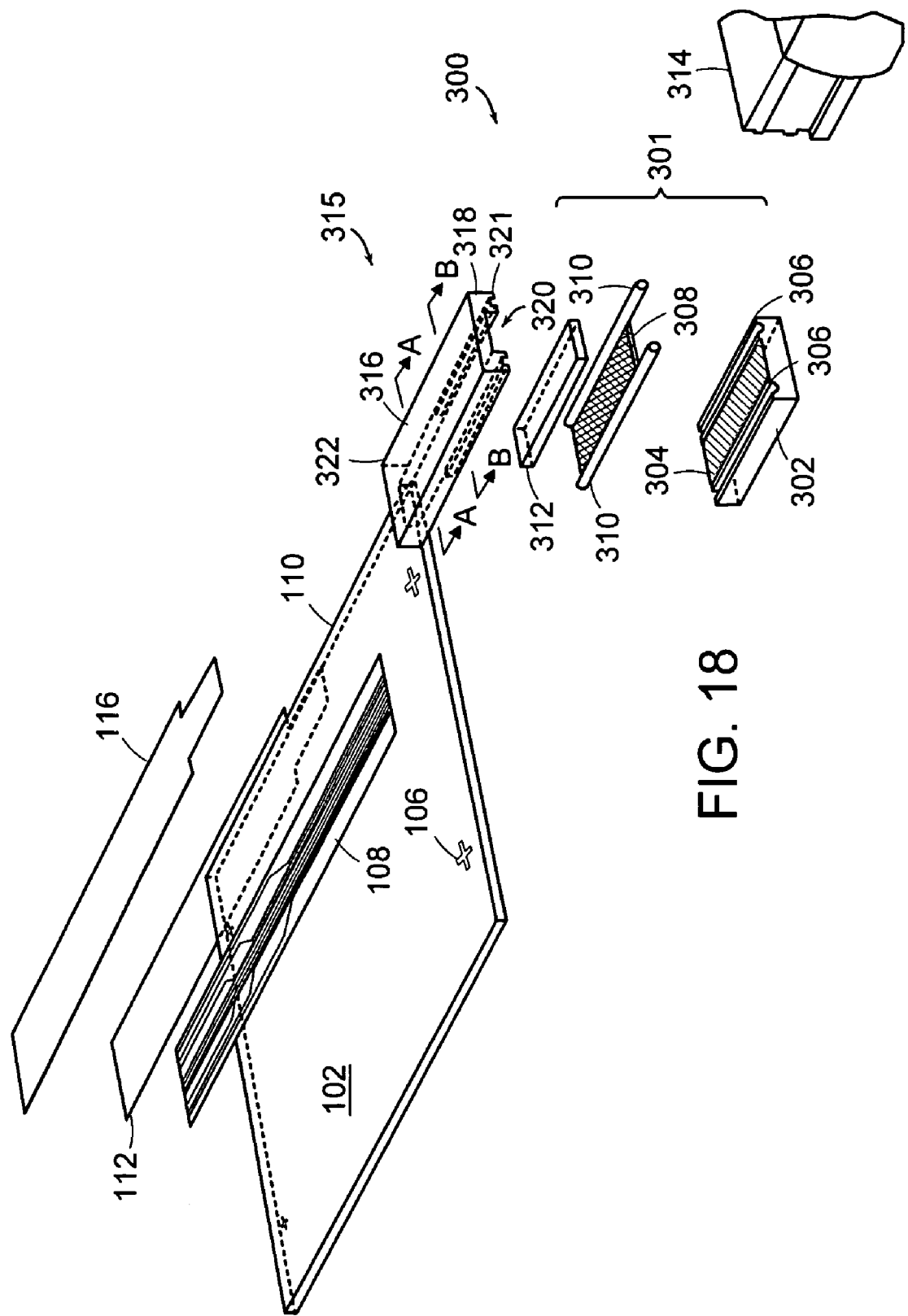
FIGS. 18 through 24 illustrate various views of another embodiment of the optical interface assembly.
Figure 19:
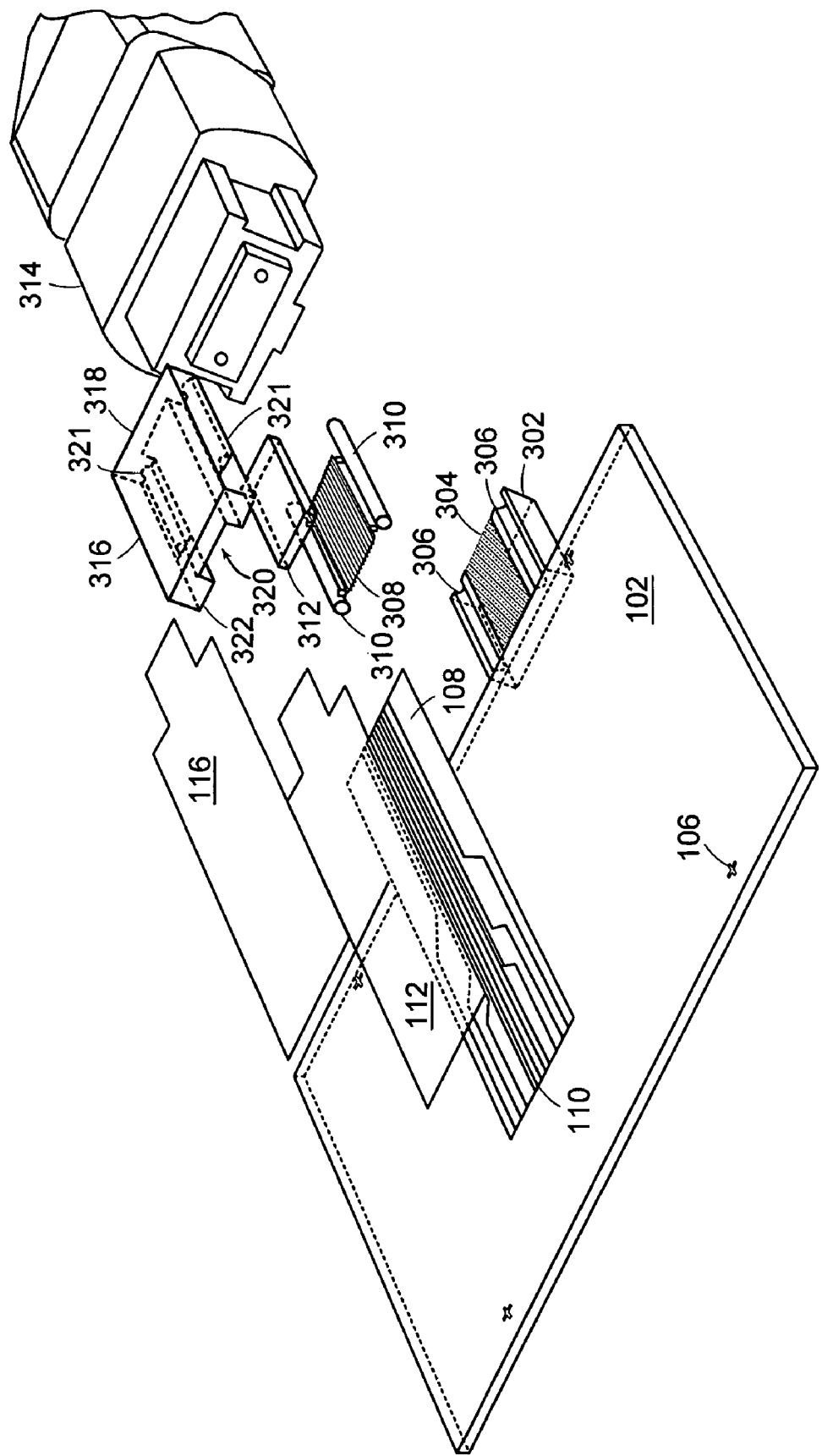
Figure 20:
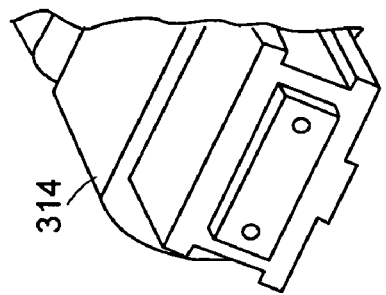
Figure 20:
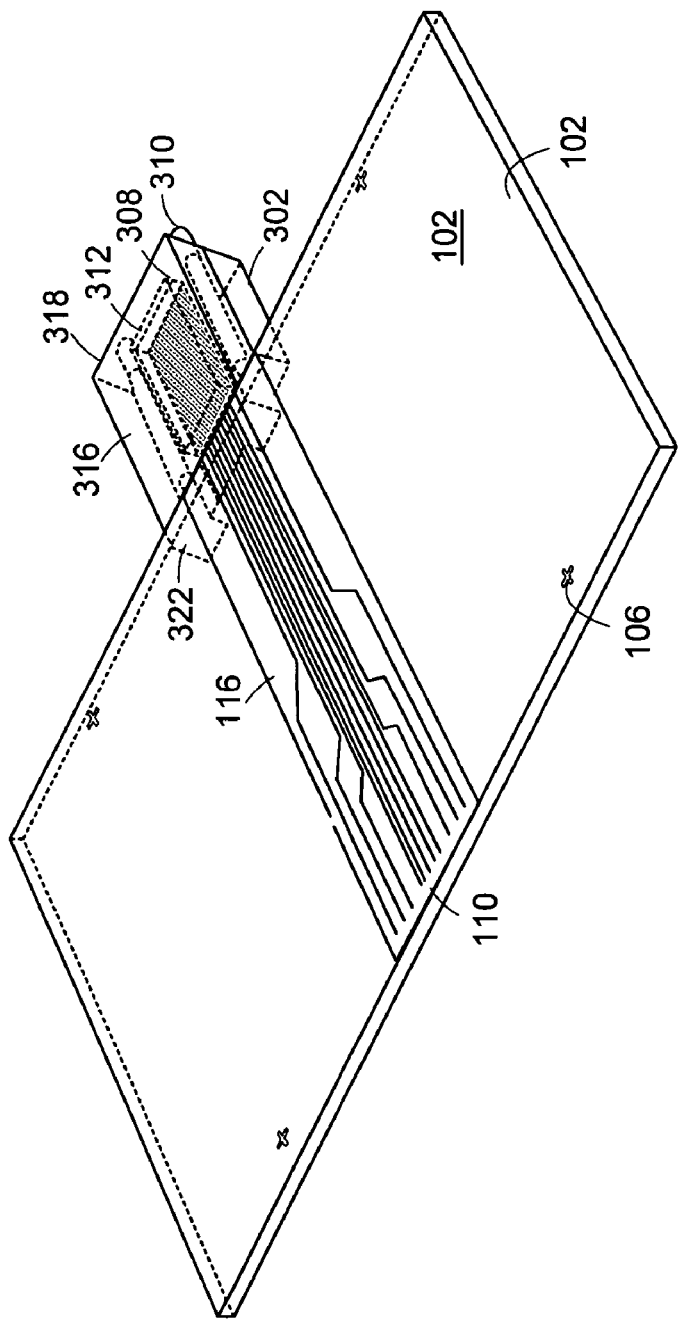
Figure 21:
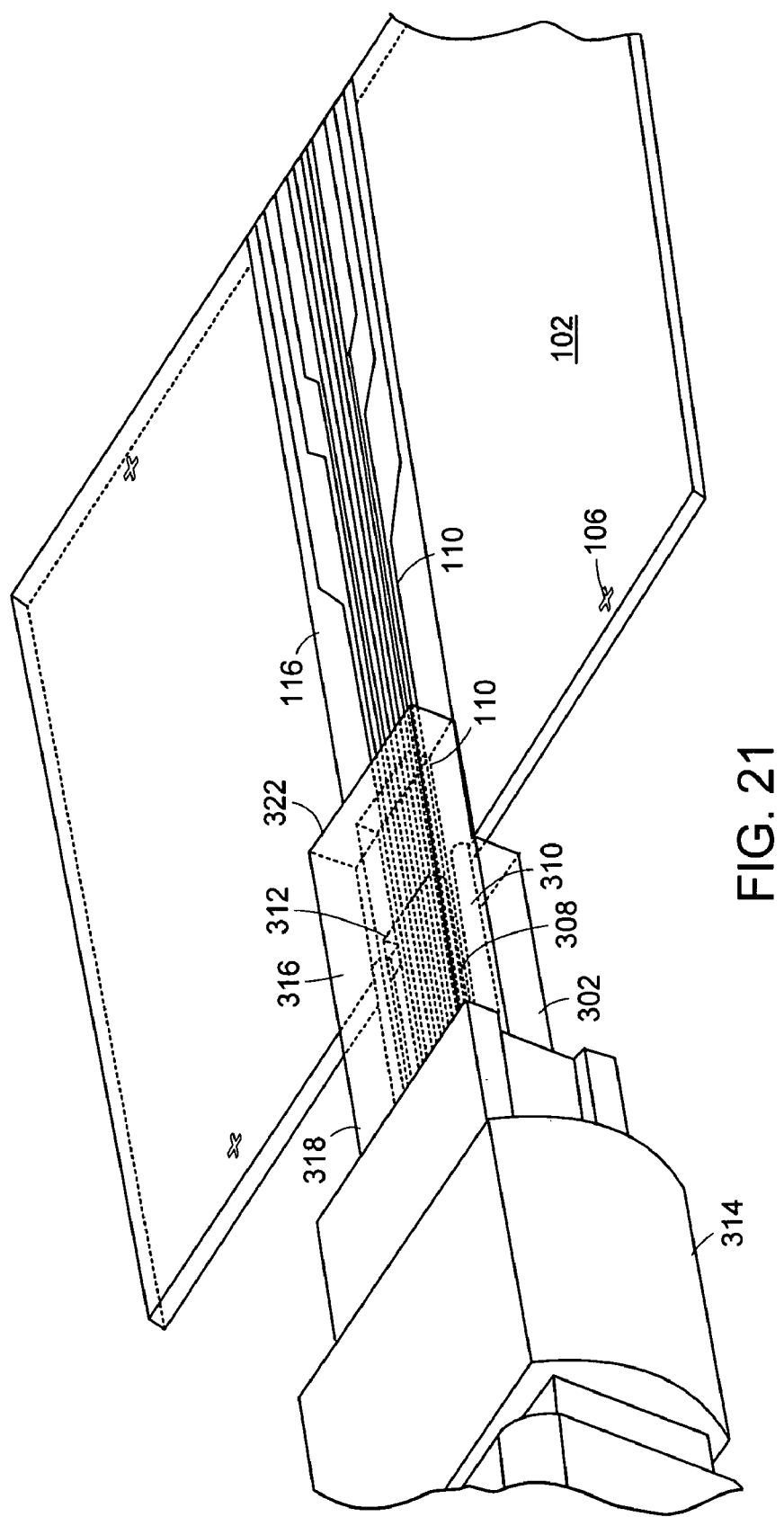
Figure 22:
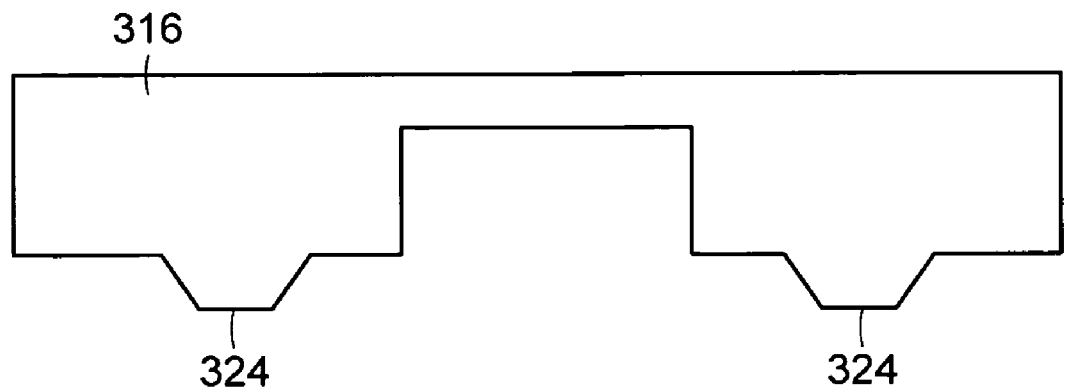
Figure 23:
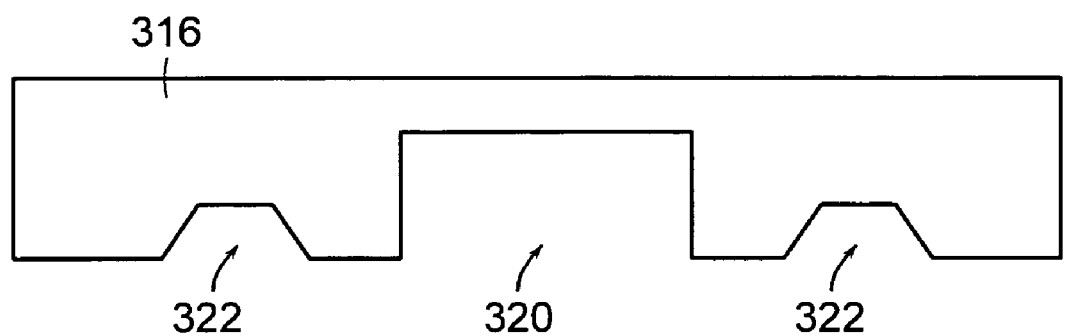

FIG. 22 is a cross sectional view of the second portion 315 of the optical interface assembly 300, taken along the lines A-A of FIG. 18. In particular, FIG. 22 illustrates an exemplary pair of male connection studs 324 on a bottom surface of the top member 316. Although FIG. 22 depicts the male connection studs 324 formed directly from the material (e.g., silicon, molded plastic) of the top part 315, the male connection studs could be formed from another material to be fitted into or onto the top part 315. Furthermore, in this embodiment, the male connection studs 324 are configured to mate with female connection slots on the embedded waveguide assembly 120. FIG. 23 is a cross sectional view of the top member 316 of the optical interface assembly 300, taken along the lines B-B of FIG. 18. In particular, FIG. 23 illustrates the pair of alignment pin grooves 322 to accommodate the alignment pins 310, as well as the recess portion 320 to accommodate the lid member 312.

Figure 24:
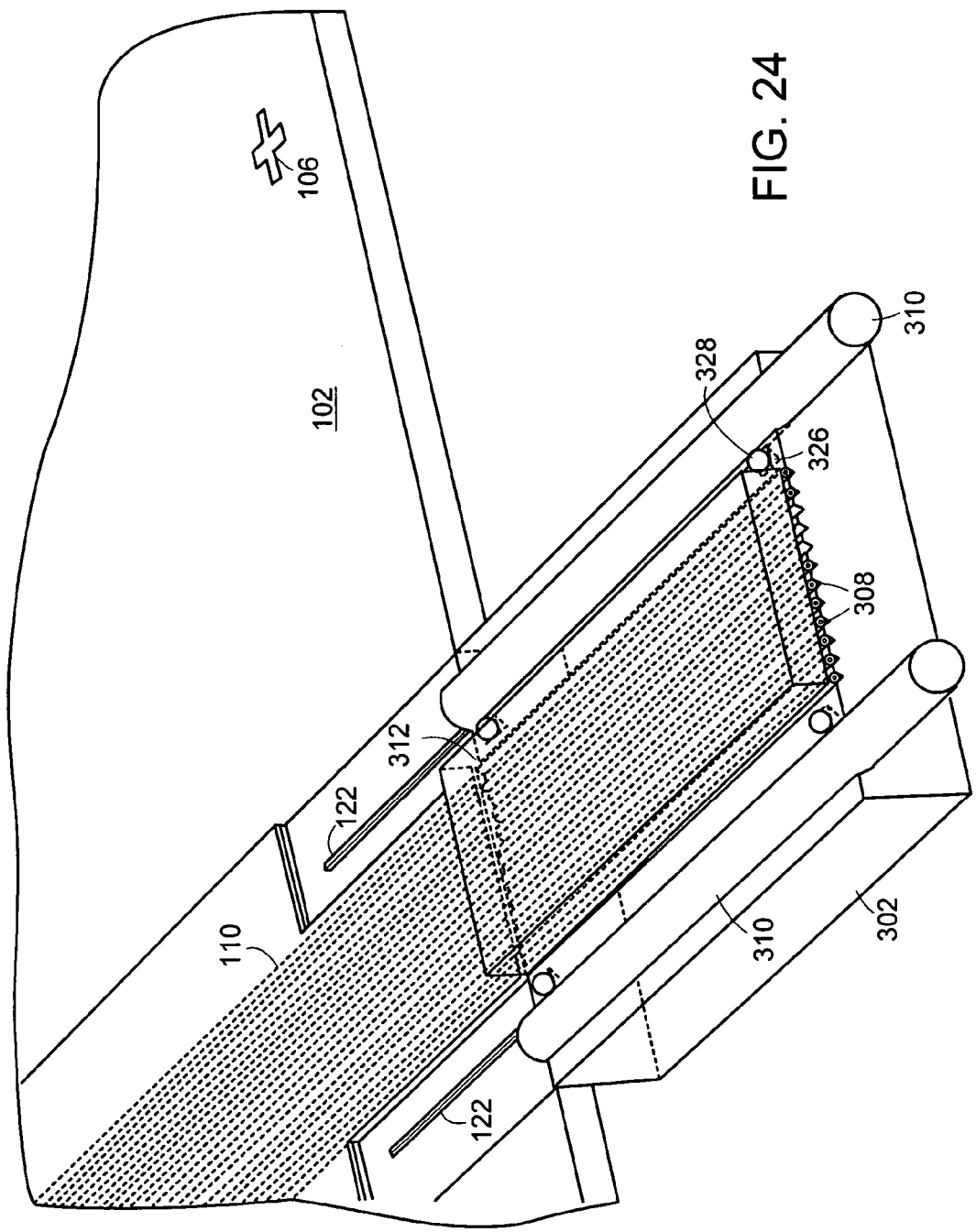

FIG. 24 illustrates the relative positions of the printed wiring board substrate 102, with waveguide core segments 110, and the optical interface assembly 300 with the optical fibers 308 and the top member removed. The waveguide core segments 110 are accurately aligned with the optical fibers 308 in the optical interface assembly 300, so as to provide reduced transmission loss of an optical signal. As shown in FIG. 24, the outer segments 122 on the PWB substrate 102 are shown as additional segments of waveguide core material for use as alignment guides for the top member (not shown in FIG. 24). The segments 122, in this example, may be manufactured at the same time as the waveguide core segments 110 through photolithography. Consequently, the segments 122 may be registered to the waveguide core segments 110 with sub-micron accuracy.

Also depicted in FIG. 24 are optional, additional alignment features to register the top member 316 to the base member 302. In this regard, a plurality of voids or pits 326 are formed in the top surface of the base member. The voids may be pyramid shaped, as shown, or may be shaped in a different manner. Where a silicon material is used for the base member 302, the voids 326 are particularly suited to be created in a pyramid shape. The voids 326 are configured to receive precision mating balls 328 disposed therein. A void/ball configuration may be particularly suitable where a male connector is to be used, and/or in the event alignment pins 310 are not provided. As will be appreciated, the top member 316 will also include corresponding voids to align to the top of the balls 328. Although a void/ball arrangement is depicted, other arrangements of male/female alignment features may also be used with equally good results to accurately align the base and top members.

The top member 316, including the various alignment features discussed above may be assembled as part of the optical interface assembly 300 using a suitable bonding adhesive. Then, the completed optical interface assembly 300 may be bonded to the printed wiring board substrate 102. Alternatively, the top member 316 may be first bonded to the PWB substrate 102 and thereafter assembled to the rest of the optical interface assembly 300. In either case, the various alignment grooves and features allow the constituent parts to be self aligned to one another.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical interface assembly, comprising:
  a first portion comprising a plurality of optical waveguides, said first portion being configured for mating engagement with an optical fiber connector; and
  a second portion, mated to said first portion, said second portion configured for mating engagement with an electronic substrate that comprises an embedded waveguide assembly;
  wherein said first and second portions are further configured so as to align said plurality of optical waveguides, at a first end of said first portion, with a plurality of corresponding waveguide cores of said embedded waveguide assembly, and wherein said first and second portions are further configured so as to align said plurality of optical waveguides, at a second end of said first portion, with a plurality of corresponding optical fibers in said optical fiber connector, wherein said plurality of optical waveguides terminate at said first end of said first portion.

2. The optical interface assembly of claim 1, wherein said plurality of optical waveguides comprise a plurality of optical fibers.

3. The optical interface assembly of claim 1, wherein said first portion further comprises;
  a base member comprising a plurality of fiber grooves formed therein, said base member further comprising one or more female connection features formed therein; and
  a top member covering said base member, said top member and said base member having said plurality of optical fibers disposed therebetween.

4. The optical interface assembly of claim 3, wherein:
  said base member and said top member are formed from a silicon substrate; and
  said fiber grooves comprise V-shaped grooves.

5. The optical interface assembly of claim 3, wherein said base member and said top member are formed from a molded plastic material.

6. The optical interface assembly of claim 3, wherein said top member of said first portion comprises a pair of flanges defined along outer edges thereof so as to accommodate said second portion.

7. The optical interface assembly of claim 6, wherein said second portion member further comprises a pair of prongs for engaging with said pair of flanges.

8. The optical interface assembly of claim 3, wherein:
  said second portion further comprises at least one male or female connection feature formed on or in a bottom surface thereof for connecting to a female or male connection feature, respectively, of the electronic substrate.

9. The optical interface assembly of claim 2, wherein said first portion further comprises:
  a base member comprising a plurality of fiber grooves formed therein, said base member further comprising one or more female alignment features formed therein;
  a plurality of optical fibers disposed within said plurality of fiber grooves;
  one or more male alignment features disposed within said one or more female alignment features; and
  a lid member covering said plurality of optical fibers.

10. The optical interface assembly of claim 9, wherein said second portion further comprises a top member covering said lid member and said one or more male and female alignment features.

11. The optical interface assembly of claim 10, wherein:
  said base member, said lid member and said top member are formed from a silicon substrate; and
  said fiber grooves comprise V-shaped grooves.

12. The optical interface assembly of claim 10, wherein said base member, said lid member and said top member are formed from a molded plastic material.

13. The optical interface assembly of claim 3, wherein:
  said second portion further comprises at least one male or female connection feature formed on or in a bottom surface thereof for connecting to a female or male connection feature, respectively, of the electronic substrate.

14. An electronic assembly, comprising:
the optical interface assembly of claim 1; and
an electronic substrate comprising an embedded waveguide assembly;
wherein said second portion of said optical interface assembly is mated with said electronic substrate such that said plurality of optical waveguides are aligned, at a first end of said first portion, with a plurality of corresponding waveguide cores of said embedded waveguide assembly.

15. The electronic substrate of claim 14, further comprising an optical fiber connector comprising a plurality of optical fibers, wherein said first portion of said optical interface assembly is mated with said optical fiber connector such that said plurality of optical waveguides are aligned, at a second end of said first portion, with the optical fibers of said optical fiber connector.

16. The electronic substrate of claim 14, wherein said optical fiber connector is an MT connector comprising.

17. The electronic substrate of claim 14, wherein said embedded waveguide assembly comprises:
a bottom clad layer disposed over said electronic substrate;
a plurality of waveguide core segments formed over said bottom clad layer; and
a photoimageable top clad layer formed over said plurality of waveguide core segments and said bottom clad layer;
wherein at least one of said waveguide core segments is configured for passive alignment of said plurality of optical waveguides with said plurality of corresponding waveguide cores.

18. The electronic substrate of claim 14, wherein:
said second portion further comprises at least one female or male connection feature formed in or on a bottom surface thereof; and
said electronic substrate comprises at least one male or female connection feature formed thereon;
wherein the optical interface assembly is secured to said electronic substrate through mating of said at least one female or male connection feature of said second portion with said at least one male or female connection feature of said electronic substrate.

19. The electronic substrate of claim 14, wherein said electronic substrate comprises an printed wiring board.

20. A method for coupling optical fibers with electronic substrate embedded waveguides, the method comprising:
forming an optical interface assembly comprising a first portion and a second portion;
said first portion comprising a plurality of optical waveguides, said first portion further configured for mating engagement with an optical fiber connector; and
said second portion being mated to said first portion, said second portion further configured for mating engagement with an electronic substrate comprising an embedded waveguide assembly;
wherein said first and second portions are further configured so as to align said plurality at optical fibers, at an end of said first portion, with a plurality of corresponding waveguide cores of said embedded waveguide assembly, wherein said plurality of optical waveguides terminate at said end of said first portion.

* * * * *